(12) United States Patent
Gupta et al.

(10) Patent No.: US 11,943,511 B2
(45) Date of Patent: Mar. 26, 2024

(54) SYSTEMS AND METHODS FOR SELECTIVELY PROVIDING SUPPLEMENTAL CONTENT DURING PRESENTATION OF MEDIA ASSET

(71) Applicant: Rovi Guides, Inc., San Jose, CA (US)

(72) Inventors: Vikram Makam Gupta, Karnataka (IN); Vishwas Sharadanagar Panchaksharaiah, Tiptur (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/410,177

(22) Filed: Aug. 24, 2021

(65) Prior Publication Data

US 2023/0065762 A1    Mar. 2, 2023

(51) Int. Cl.
| | |
|---|---|
| H04N 21/472 | (2011.01) |
| G06F 16/48 | (2019.01) |
| G06F 16/483 | (2019.01) |
| G06Q 30/0201 | (2023.01) |
| G06V 20/40 | (2022.01) |
| H04N 21/439 | (2011.01) |
| H04N 21/44 | (2011.01) |
| H04N 21/45 | (2011.01) |
| H04N 21/4722 | (2011.01) |
| H04N 21/84 | (2011.01) |
| H04N 21/845 | (2011.01) |

(52) U.S. Cl.
CPC ....... *H04N 21/4722* (2013.01); *G06F 16/483* (2019.01); *G06F 16/489* (2019.01); *G06Q 30/0201* (2013.01); *G06V 20/41* (2022.01); *H04N 21/4394* (2013.01); *H04N 21/44008* (2013.01); *H04N 21/4532* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | |
|---|---|---|
| 8,949,889 B1 | 2/2015 | Erdmann |
| 10,779,058 B2 | 9/2020 | Panchaksharaiah et al. |
| 2002/0162110 A1* | 10/2002 | Wakimoto ....... H04N 21/23424 348/E7.071 |
| 2008/0066100 A1* | 3/2008 | Brodersen ............. G06F 16/748 348/E7.071 |
| 2013/0091071 A1 | 4/2013 | Davies |
| 2014/0125866 A1* | 5/2014 | Davy ..................... G06Q 30/00 348/462 |
| 2015/0319470 A1 | 11/2015 | Tang et al. |
| 2015/0319505 A1* | 11/2015 | Patadia ................ H04N 21/858 725/34 |

(Continued)

*Primary Examiner* — Jeffery F Harold
*Assistant Examiner* — Charles N Hicks
(74) *Attorney, Agent, or Firm* — HALEY GUILIANO LLP

(57) ABSTRACT

Systems and methods are described for generating for display identified supplemental content relevant to metadata of a particular scene of a media asset. The systems and methods may identify metadata of the media asset corresponding to the time of the particular scene, identify supplemental content relevant to the metadata of the particular scene, and determine the particular scene of the media asset has concluded. In response to determining the particular scene of the media asset has concluded, the identified supplemental content relevant to the metadata of the particular scene may be generated for display.

20 Claims, 9 Drawing Sheets

(56) References Cited

U.S. PATENT DOCUMENTS

2017/0223411 A1   8/2017   De Juan et al.
2019/0230405 A1*  7/2019   Jenkal ................ H04N 21/4622
2019/0339834 A1* 11/2019   Weiner .................... G06F 40/14

* cited by examiner

| Time | Metadata | Computed Scores | Supplemental Content |
|---|---|---|---|
| 0:00-8:00 [Scene 101] | Introduction Actor A Bank | Product Placement Strength Score: N/A Product Price Score: N/A | N/A |
| 8:01-19:59 [Scenes 103, 105, 107] | Rising Action/Conflict Car Chase Actor A & Actor B Car A & Car B Bank | Product Placement Strength Score (Car A): 75 Product Price Score (Car A): 25 Product Placement Strength Score (Car B): 55 Product Price Score (Car B): 20 | N/A |
| 20:00-26:59 [Scene 109] | Climax Car Chase Fight Scene Actor A & Actor B Car A & Car B | Product Placement Strength Score (Car A):91 Product Price Score (Car A): 25 Product Placement Strength Score (Car B): 60 Product Price Score (Car B): 20 | URL: Car A video URL: Car B video |
| 27:00-30:00 [Scene 111] | Falling Action/Resolution Actor A & Car A Bank | Product Placement Strength Score (Car A): 65 Product Price Score (Car A): 25 Product Placement Strength Score (Car B): 50 Product Price Score (Car B): 20 | URL: Car A video URL: Car B video |

150
126 128 130 132
134 136 138 140

| Introduction | Rising Action/ Conflict | Climax | Falling Action & Resolution |
|---|---|---|---|

116 121 124 125

Insert supplemental content (e.g., URL: Car A video) — 142

FIG. 1B

SYSTEMS AND METHODS FOR SELECTIVELY PROVIDING SUPPLEMENTAL CONTENT DURING PRESENTATION OF MEDIA ASSET

BACKGROUND

This disclosure is directed to systems and methods for providing supplemental content during presentation of a media asset. In particular, techniques are disclosed for, based on identifying a particular scene of the media asset, generating for display identified supplemental content relevant to metadata of the particular scene of the media asset.

SUMMARY

Modern media distribution systems enable a user to access more media content than ever before, and on more devices than ever before. Many content providers desire to provide supplemental content with requested media content, e.g., to provide a user with additional information and/or opportunities for further interaction with content. In one approach, a prompt may be provided to enable a user to access supplemental information while a media asset is playing. However, in such approach, the prompt often interferes with the viewing experience of the user at suboptimal times, i.e., the prompt is provided without regard to the importance of a particular scene of the media asset, and may be distracting and frustrating for the user during an important scene. On the other hand, if the supplemental content is provided during a scene where the user is likely to be uninterested and/or looking away from his or her device, the user is likely to ignore the prompt, and an opportunity to engage with the user will be missed. Moreover, if the content provider bombards the user with supplemental content prompts throughout the playing of the media asset, the user will likely be left frustrated and may stop watching the media asset, and the content provider may expend computing and networking resources to generate and transmit the supplemental content without any benefit to the content provider or the user.

To help overcome these problems, systems and methods are provided herein for generating for display the identified supplemental content relevant to the metadata of a particular scene of a media asset at an optimal time during the presentation of the media asset. The provided systems and methods may determine a time of the particular scene of a media asset currently being played, identify metadata of the media asset corresponding to the time of the particular scene, and identify supplemental content relevant to the metadata of the particular scene. Based on the identification of the particular scene, the identified supplemental content relevant to the metadata of the particular scene may be generated for display.

Various techniques may be employed to determine when and where and how to add supplemental context based on the particular scene. In some embodiments, the identified supplemental content relevant to the metadata of the particular scene may be generated for display after the conclusion of the particular scene, e.g., to avoid interrupting the user's viewing experience of the particular scene (e.g., corresponding to a pivotal moment such as a climax of the media asset). In some embodiments, the identified supplemental content relevant to the metadata of the particular scene may be generated for display during the particular scene, e.g., if waiting until after the particular scene concludes might risk the user losing interest in the subject matter of the supplemental content by the time it is displayed. In some embodiments, the identified supplemental content relevant to the metadata of the particular scene may be generated for display prior to the particular scene.

Such aspects enable selectively providing supplemental content to a user at a time when the user is determined to be likely to be paying attention to the media asset, but at the same time avoiding interrupting the viewing experience of the user by providing the supplemental content during a particular scene (e.g., a climax or critical portion or any other scene likely to capture the user's interest, of the media asset). Thus, cluttering the limited user interface of a device of the user with supplemental content throughout the presentation of the media asset and/or during important portions of the media asset may be avoided, while at the same time supplemental content may be conveniently provided to the user interface of the device of the user at an optimal time to maximize the likelihood of user engagement with the supplemental content. Consequently, computing resources may be more efficiently utilized by providing supplemental content at a time that the user is determined to be likely to engage with the supplemental content, and the user experience may be improved by providing supplemental content the user that is likely to be interested in at suitable times during the media asset presentation.

In some embodiments, the supplemental content relevant to the metadata of the particular scene is generated for display immediately after the conclusion of the particular scene.

In some aspects of this disclosure, the provided systems and methods are further configured to determine a duration of the particular scene, and determine, based on the duration of the particular scene, an amount of time remaining in the particular scene. A determination may be made (e.g., using control circuitry) whether the amount of time remaining in the particular scene is less than a predefined threshold period of time, and in response to determining that the amount of time remaining in the particular scene is less than a predefined threshold period of time, the generating for display of the identified supplemental content relevant to the metadata of the particular scene may be performed in response to determining the particular scene of the media asset has concluded.

In some embodiments, identifying metadata of the media asset corresponding to the time of the particular scene comprises identifying a product depicted during the time of the particular scene. In some embodiments, identifying the supplemental content relevant to the metadata of the particular scene (and/or determining or identifying the particular scene itself) may be performed based on: determining a popularity of a character of the media asset featured in the time of the particular scene; determining a prominence of a depicted placement of the product; and determining the relevance of the product to a user profile associated with consumption of the media asset. In some embodiments, one or more of determining a popularity of a character of the media asset featured in the time of the particular scene; determining a prominence of a depicted placement of the product; and determining the relevance of the product to a user profile associated with consumption of the media asset, may be employed to determine and/or identify whether a scene corresponds to a particular scene for which supplemental content associated with the particular scene should be generated or retrieved.

In some aspects of this disclosure, determining the time of the particular scene of the media asset comprises: analyzing audiovisual attributes of a currently playing portion of the media asset, and determining whether the currently playing portion of the media asset is within the time of the particular scene may be performed based on the analyzed audiovisual attributes of the currently playing portion.

In some embodiments, the provided systems and methods may be further configured to identify a genre of the media asset, and determining whether the currently playing portion of the media asset is within the time of the particular scene may be based on the analyzed audiovisual attributes of the currently playing portion and the genre of the media asset.

In some aspects of this disclosure, the provided systems and methods may be further configured to determine an amount of time remaining in the media asset, and determining whether the currently playing portion of the media asset is within the time of the particular scene is based on the analyzed audiovisual attributes of the currently playing portion and the amount of time remaining in the media asset.

In some embodiments, determining the time of the particular scene of the media asset comprises: identifying viewership information, in a plurality of user profiles, related to consumption of the media asset, where determining whether the currently playing portion of the media asset is within the time of the particular scene is based on the identified viewership information.

In some aspects of this disclosure, determining the time of the particular scene of the media asset comprises identifying viewership information related to consumption of the media asset by a plurality of users, and determining whether the currently playing portion of the media asset is within the time of the particular scene is based on the identified viewership information. Identifying the viewership information may comprise retrieving via a network one or more of social media posts related to the media asset, reviews or summaries of the media asset, and information in the plurality of user profiles specifying portions of the media asset skipped.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 1B shows illustrative data structures used for providing supplemental content relevant to metadata of a particular scene of a media asset, in accordance with some embodiments of this disclosure;

DETAILED DESCRIPTION

As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

Figure 1A:
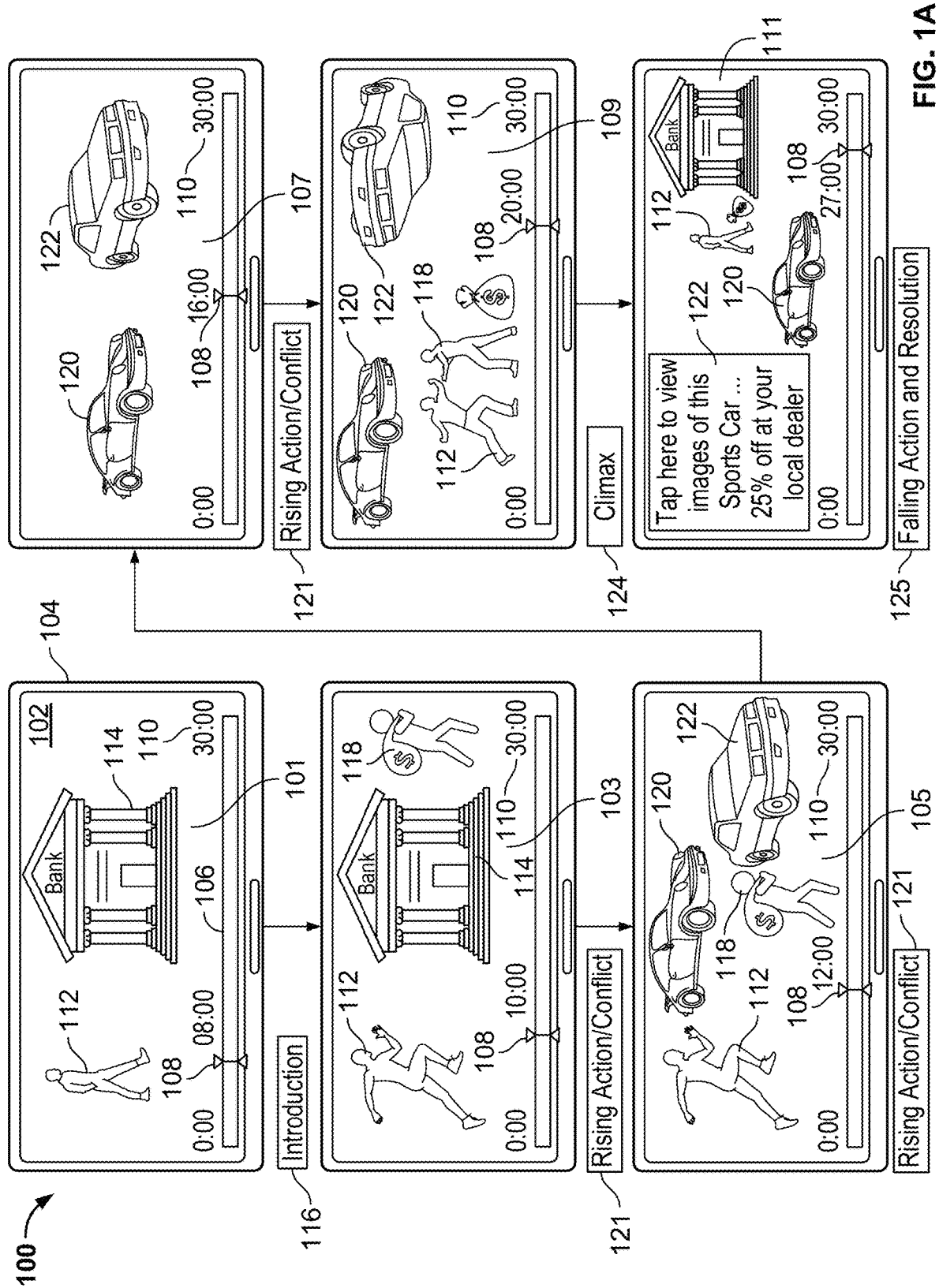
FIG. 1A shows a block diagram of an illustrative system for providing supplemental content relevant to metadata of a particular scene of a media asset, in accordance with some embodiments of this disclosure.

FIG. 1A shows a block diagram of an illustrative system for providing supplemental content relevant to metadata of a particular scene of a media asset, in accordance with some embodiments of this disclosure. A media application (e.g., executed at least in part on user equipment 104) may generate for display media asset 102 on user equipment 104, e.g., in response to receiving a user request to view media asset 102. Media asset 102 may be generated for display from a broadcast or stream received at user equipment 104, or from a recording stored in a memory of user equipment 104 and/or a remote server (e.g., from media content source 602 or server 604 of FIG. 6). User equipment 104 may be, e.g., a television and/or may include an integrated display, e.g., on a smartphone or tablet, or may by connected to an external display device, e.g., a television. When generating for presentation scene 101 of media asset 102, the media application may provide progress bar 106 overlaid on scene 101 (e.g., associated with a timestamp range of 0:00-8:00 as shown at 134 of FIG. 1B) and indicating a current play position time 108 (e.g., 8:00 minutes) within total time duration 110 (e.g., 30 minutes) of media asset 102. Scene 101 of media asset 102 may comprise one or more frames and depict a plurality of objects, such as, for example, first actor 112 walking near a building 114 (e.g., a bank). The object may be a person, an item, a product, a location, a landmark, or any other suitable object. The media application may identify objects in scene 101 using any suitable technique. For example, the media application may receive (e.g., from media content source 602 or server 604 of FIG. 6) metadata (e.g., metadata of category 128 for time period 134 of data structure 150 shown in FIG. 1B) including detailed information about the objects associated with particular timestamps associated with frames or segments of media asset 102, and such metadata may be stored in data structure 150. In some embodiments, detecting an object may comprise utilizing one or more techniques for object recognition such as, for example, image processing, edge detection, color pattern recognition, partial linear filtering, regression algorithms, and neural network pattern recognition. The media guidance application may perform image analysis on each object that is detected to determine the identity of each object, and may be configured to search a database of videos and associated objects for each of the plurality of candidate objects.

The media application may determine that scene 101 is associated with a portion of media asset 102 that corresponds to an introduction or exposition 116 of media asset 102. The media application may employ any suitable technique to identify a plot structure category or other suitable scene identifier that a particular segment or scene of media asset 102 corresponds to. For example, the media application may utilize one or more of metadata items associated with a particular scene (e.g., manually labeled by human curators based on a review of media asset 102), analysis of audiovisual attributes of the particular scene (e.g., genre-based heuristics), and/or viewership information related to consumption of the media asset by a plurality of users (e.g., online plot reviews, viewership curves, social media activity), etc. In some embodiments, the media guidance application may search through metadata associated with each scene of the media asset, and/or utilize any other suitable technique, to extract or generate a set of tags that identify themes in the respective scene, e.g., "exposition," "fight," "car chase," "plot twist," "inciting incident," "climax," "resolution," "denouement," etc. The media application may identify a timestamp within media asset 102 of a significant occurrence in media asset 102, e.g., the climax or a fight. For example, the media application may reference the timestamp of a current scene and associate such timestamp with the identified plot structure category or other scene identifier of a particular scene or segment.

Scene 103 (e.g., associated with a timestamp range of 8:01-19:59 as shown at 136 of FIG. 1B) of media asset 102 may depict first actor 112 (e.g., a police officer, a superhero, or Good Samaritan) running towards and chasing second actor 118, upon first actor 112 realizing that second actor 118 has robbed bank 114 and is running away with money stolen from the bank. The media application may identify these objects and determine that current play position time 108 (e.g., 10 minutes) of scene 103 is associated with a plot structure category of "Rising Action/Conflict" 121 using any of the aforementioned suitable techniques. For example, the media application may reference metadata labeling scene 103 as "Rising Action/Conflict" 121, and/or the media application may reference metadata of media asset 102 indicating a genre of "Action" for media asset 102. Based on this genre, the media application may perform a heuristic-based analysis to determine the plot structure category or other scene identifier. To determine whether scene 103 is a particular scene of interest, the media application may analyze scene 103 to determine the occurrence of fast-paced and/or loud audio above a certain threshold, actors 112, 118 rapidly moving, important actors or characters being depicted together in a scene, the scene being towards the end of the movie, the occurrence of violence or a car chase, etc. For example. scene 109 (e.g., associated with the timestamp of 20:00-26:59 of media asset 102) may be determined to correspond to (e.g., constitute or otherwise form part of) a particular scene (e.g., a climax of media asset 102) due to the media application detecting audio of a certain level (e.g., 80 dB) which exceeds a predefined threshold (e.g., 75 dB) in conjunction with other factors. For example, such audio level above the predefined threshold may be determined by the media application to begin to occur at the timestamp of 20:00 of scene 109 for a predefined period of time (e.g., 5 seconds), which may signify the beginning of the particular scene of interest, such as the climax or other segment of media asset 102. The end of the particular scene (e.g., the climax) may be identified based on the media application determining that the audio level has dropped below the threshold (e.g., for a predetermined period of time, such as, for example, 10 seconds). Such determinations may be coupled with the determination by the media application that scene 109 (e.g., the climax) is occurring in towards the end of media asset 102 (e.g., in the second half of the playing time) and thus may be more likely to reflect a scene of interest to the user.

As an example, scene 109 (e.g., associated with the timestamp of 20:00-26:59 of media asset 102) may be determined to correspond to (e.g., constitute or otherwise form part of) a particular scene (e.g., a climax of media asset 102) due to one or more of being 75% toward the end of the movie, having audio above a predefined threshold and/or depicting an amount of violence above a predefined threshold, the remaining scenes of media asset comprising dialogue and minimal movement until the end of the media asset, and/or any other suitable factors. However, given the relatively early timing of scene 103 within duration 110 (e.g., 10 minutes into a 30-minute runtime, roughly at the ⅓ mark of media asset 102), the media application may make a heuristic-based determination that it is unlikely that scene 103 corresponds to a particular scene of interest (e.g., a climax) of media asset 102. Additionally or alternatively, the media application may reference, retrieve or generate a viewership curve associated with media asset 102, e.g., based on whether particular scenes were skipped, a number of users that consumed a certain scene, a number of (and/or contents of) social media comments associated with a particular scene, etc. Such viewership information may be received from, e.g., from media content source 602 or server 604 of FIG. 6). In some embodiments, any suitable scene of media asset 102 may be identified by the media application as a particular scene of interest for which associated supplemental content may be generated. For example, any scene determined by the media application as likely to capture the attention of the user consuming media asset 102 and/or any scene associated with a product placement likely to interest the user may be identified by the media application as the particular scene, regardless of whether the particular scene corresponds to the climax of media asset 102. For example, a fight scene or car chase occurring relatively early in the playing of a media asset may not correspond to the climax of the media asset but may nonetheless feature a product (e.g., a sports car) and/or other features likely to interest the user.

Scene 105 (e.g., associated with a timestamp range of 8:01-19:59 as shown at 136 of FIG. 1B) of media asset 102 may depict first actor 112 continuing to chase second actor 118, and may introduce cars 120, 122 that first actor 112 and second actor 118 are respectively running towards. In some embodiments, the media application may compute certain scores (e.g., computed scores of category 130 of FIG. 1B including one or more of a product placement strength score, and/or a product price score) for each identified object, e.g., cars 120, 122. For example, for car 120, a product placement strength score may be weighted depending on a variety of factors, e.g., whether actor 112 touching or riding in or otherwise associated with car 120 is a popular actor; whether actor 112 is discussing car 120 in a positive way or at all; how many pixels of the screen car 120 is associated with in a current scene; social media activity discussing car 120; whether a user profile of a user consuming media asset 102 specifies preferences or viewing histories indicative of a likely interest in car 120 or actor 112, etc. Based on the techniques described above, the media application may determine whether a scene corresponds to a particular scene of interest (e.g., a climax, or another scene which is determined to be associated with scores above a certain threshold) for which supplemental content may be generated or retrieved. In some embodiments, computed scores of category 130 may include a product price score, e.g., the media application may query a search engine or invoke an API call to a website of an application associated with car 120 or otherwise offering car 120 for sale to determine whether a current price of car 120 reflects car 120 being on sale relative to a typical price of car 120 (e.g., represented as a percent offer over a regular sticker price). In some embodiments, product price score may be weighted based on the inference that the lower the price, the higher the likelihood of user interest in car 120. Such product price score may be taken into in determining whether a scene corresponds to a particular scene of interest.

Scene 107 (e.g., associated with a timestamp range of 8:01-19:59 as shown at 136 of FIG. 1B) of media asset 102 may depict a car chase in which car 120 (being driven by first actor 112) is chasing car 122, being driven by second actor 118. Computed scores of category 130 may be computed for scene 107 based on the techniques discussed above and below, and the media application may determine that scene 107 continues to correspond to a plot structure category of "Rising Action/Conflict" 121. In some embodiments, the computed scores may be used for various purposes, e.g., to determine whether (and which) supplemental content should be generated for display and/or retrieved in connection with a particular scene. The computed scores may be employed in determining whether a scene corresponds to a particular scene of interest, e.g., whether the scene comprises a product placement for which the media application determines supplemental content should be generated for display).

Scene 109 (e.g., associated with a timestamp range of 20:00-26:59 as shown at 138 of FIG. 1B) of media asset 102 may depict a car chase in which car 120 (being driven by first actor 112) of media asset 102 may depict a conclusion of the car chase in which car 120 (having been driven by first actor 112) has caused car 122 (having been driven by second actor 118) to flip, leading to a fistfight between actor 112 and actor 118, each having exited their respective vehicles. Scene 109 may be determined by the media application to correspond to a time of the particular scene (e.g., climax 124) of media asset 102 based on one or more of a variety of factors. For example, metadata of category 128 corresponding to timestamp 138 (within which scene 109 falls) may indicate that scene 109 corresponds to the climax. As another example, the media application may determine that a current play position 108 (e.g., 20 minutes) within duration 110 (e.g., 30 minutes) may weigh in favor of a determination that a current scene corresponds to the climax, e.g., based on the inference that the scene is towards the end of media asset 102 where a climax typically occurs; but based on the determined remaining time (e.g., 10 minutes), enough time still remains to resolve any outstanding conflicts after the climax prior to the conclusion of media asset 102.

Additionally or alternatively, the media application may analyze audiovisual attributes of scene 109 and may determine that the significant amount of action having taken and taking place (e.g., a flipped car, a fistfight, violence involving main actor 112), taken together with the genre of media asset 102 (e.g., "Action") may indicate that current scene 109 is a time of a particular scene of interest (e.g., a climax or otherwise constitutes a scene of interest in connection with identifying supplemental content associated therewith). In some embodiments, different heuristics may be employed by the media application based on the genre of the media asset. For example, the media application may identify portions of a media asset as being of the genre of a romantic comedy, and identify portions of the media asset in which the main characters are together for a relatively long period of time and/or kissing or a proposal is occurring or is likely to occur, and determine that such an identified scene weighs in favor of a determination of a time of a particular scene of interest (e.g., a climax of media asset 102). As another example, if the genre corresponds to a sports movie, the media application may identify certain scenes (e.g., a last-second shot in a championship basketball game) as weighing in favor of a determination of a time of a particular scene of interest (e.g., a climax or critical moment likely to capture the attention of the user). Additionally or alternatively, the media application may reference or otherwise generate information related to viewership information (e.g., online plot reviews, social media activity, viewership curves associated with the particular scene), which may weigh in favor of a determination of a time of the particular scene of interest. In some embodiments, computed scores of category 130 may inform the determination of whether a current scene corresponds to the particular scene of interest (e.g., the climax), e.g., time 138 may be determined to correspond to the particular scene of interest (e.g., a climax) based at least in part on the computed scores of category 130 for time 138 exceeding computed scores of other scenes of media asset 102.

The media application, e.g., in response to determining that scene 109 corresponds to a particular scene of interest (e.g., climax 124 of media asset 102 and/or a fight scene and car chase of media asset 102), may identify supplemental content relevant to metadata of the media asset. In some embodiments, supplemental content may be text, graphics, video, or any other visual (and/or audio) depiction of information related to metadata of the media asset, e.g., an advertisement, a website, auxiliary information or auxiliary videos related to a particular product or service, such as, for example, a product or service shown, discussed, or otherwise referenced in the media asset. For example, supplemental content may be related to a promotion, sale, coupon, discount, newly available product, wish list of the user, or any other information the advertiser wishes to inform the user about to entice him or her to purchase goods or a service. As shown in FIG. 1B, category 132 of data structure 132 specifies supplemental content 132 for particular timestamps. The identified particular scene of interest (e.g., climax 124) may be associated with a URL related to supplemental content 142 associated with a video related to car 120 as well as a URL at which the video related to car 122 may be accessed.

For example, a product placement strength score for scene 109 may be determined based on combining (e.g., computing an average, adding together, etc.) numerical scores of a variety of factors, e.g., a timing in the plotline of the product placement; a character and/or actor associated with the product placement; a prominence of the product placement; whether user preferences of the user consuming media asset 102 indicated an interest in the product placement. Such scores may be output by a trained machine learning model, which may be trained with labeled examples indicating scores associated with each training example. In some embodiments, the product placement strength score for car 120 ("Car A") of FIG. 1A in scene 109 corresponding to timestamp 138 may be computed in the following illustrative manner. A score for timing in the plotline may be assigned based on whether the particular scene is likely to be of interest to the user (e.g., proximity to the climax or proximity to a fight scene), e.g., a score of 100 may be assigned since scene 109 corresponds to a particular scene of interest (e.g., the climax). A score for the character or actor may be assigned a score of 90, e.g., the main character may be assigned a score of 100, and actor 112 may be included in a predefined rank of popular actors assigned a score of 80, which may average to score of 90 for actor 112 in scene 109. A score for a prominence of the product placement may be, e.g., 86, based on the percentage of time of the scene that car 120 is prominently visible during the scene, 86% of the scene. A score of, e.g., 88 may be assigned based on the user preferences, e.g., based on how often and/or how recently a user searched for content similar to car 120. The product placement strength score may be calculated as, e.g., an average of each of these four scores, which results in a product placement strength score of 91 (100+90+86+88)/(4). The product price score of car 120 may be based on the comparison of the best current offer to the sticker price, e.g., a score of 90 may be assigned if a product is available at a 90% discount; in this instance, since car 120 is available at a 25% discount, a score of 25 may be assigned. It should be appreciated that the computations described above are illustrative, and any suitable factors and methodologies may be used to compute the product placement strength score and product price score.

The media application may determine whether a particular scene is scene of interest, and/or whether to present supplemental content based at least in part on the computed scores of category 130. For example, the media application may compute an overall score for a particular item (e.g., depicted in the partial scene of interest, and used to identify the supplemental content) based on combining the product placement strength score and the product price score for the particular item, and may compare such score to a threshold. In some embodiments, the threshold may be a standard value, or may differ for different users based on viewing habits and purchasing habits of the user, and if the media application determines the combined score exceeds the threshold score, the media application may determine that a likelihood of user interaction with supplemental content related to the particular item is sufficiently high to justify generating for presentation alert message or notification 122 associated with the supplemental content. In some embodiments, the combined score may correspond to a ratio between the product placement strength score and the product price score, an average score as between the product placement strength score and the product price score, and/or one or more of the scores may be weighted more highly than another in the computation, or a higher of the two scores may be used for comparison to the threshold. In some embodiments, if each of the combined scores for car 120 and 122 exceeds the threshold value, a notification or alert message (e.g., an overlay or pop-up) may be generated for display for supplemental content associated with each of the cars 120 and 122, or supplemental content may be provided only for the object having the higher of the scores. In some embodiments, the notification or alert may be provided to a second screen device (e.g., a mobile device of the user) while media asset 102 is being generated for display at another device (e.g., a smart television in a vicinity of the second screen device). Notification 122 may be provided in any suitable format (e.g., displayed to the user, audio alert, haptic alert, or any combination thereof). The media application, upon receiving selection of the message 122, may cause the device (e.g., device 104 or another device in a vicinity of device 104) to be re-directed to a website or application associated with the supplemental content related to car 120.

In some embodiments, the media application may delay or time shift the presentation of notification 122 until after the identified particular scene (e.g., climax 124) concludes, e.g., to avoid interrupting the user during the particular scene. As shown in FIG. 1B, supplemental content 142 may be inserted at scene 111 (e.g., associated with a timestamp range of 27:00-30:00 as shown at 140 of FIG. 1B) corresponding to falling action and resolution portion 125 of the plot structure, once the particular scene (e.g., the climax) concludes. For example, the media application may generate for presentation alert 122 (associated with supplemental content related to car 120) at scene 111 corresponding to falling action and resolution portion 125 of the plot structure, once the particular scene (e.g., the climax) concludes. In some embodiments, generating for presentation alert 122 or other supplemental content may correspond to retrieving stored supplemental content (e.g., from media content source 602 or server 604), or otherwise processing the supplemental content for presentation to the user, at any suitable time (e.g., prior to, during or after the particular scene of interest). Falling action and resolution portion 125 depicts actor 112 having returned to bank 114 in car 120 to return the money stolen by second actor 118. In some embodiments, even if car 120 associated with supplemental content is not depicted in falling action and resolution portion 125, a thumbnail depicting car 120 that is related to the supplemental content may be presented to the user as a reminder of the object. In some embodiments, the supplemental content alert may be presented during the particular scene of interest (e.g., the climax), or right before the particular scene of interest (e.g., at scene 107). In some embodiments, any portion of asset 102 determined to be likely to capture the attention (and/or cause excitement) of a user consuming media asset 102 may be identified as a portion at which to present supplemental content, e.g., even if such portion of the media asset does not correspond to the particular scene of interest. In such instance, the media application may present the supplemental content overlaid at the identified portion, or may identify the next portion of media asset 102 unlikely to interest the user and present the supplemental content at the identified next portion. In some embodiments, other plot structure portions (e.g., falling action and resolution 125) may be leveraged as a portion at which to provide supplemental content, e.g., in a case that a price of a particular product is detected at a significant discount, e.g., as compared to the climax scene, such as if a new sale recently was released in the interim.

In some embodiments, machine learning techniques may be employed to determine a time of a particular scene of interest (e.g., a climax, a fight scene, a car chase, etc.) of media asset 102 and/or when the particular scene of interest has concluded and/or whether supplemental content should be provided to the user. For example, a machine learning model (e.g., a neural network, a native Bayes model, logistic regression, etc.) may be trained to recognize a beginning and an end of the particular scene of interest using training data of various audiovisual frames of media assets manually labeled to indicate whether certain portions correspond to a beginning or end of the particular scene of interest. The trained machine learning model may learn, e.g., genre-specific patterns of which features of content are indicative of a beginning and an end of the particular scene of interest. In addition, a machine learning model (e.g., a neural network, native Bayes model, logistic regression, etc.) may be trained on information to determine a suitable threshold that computed product placement and/or product price scores may be compared to, and/or whether to schedule placement of supplemental content. For example, the machine learning model may be trained using data indicating a time when prior users interacted with supplemental content or submitted a request to purchase a product associated with the supplemental content. Based on such training data, the machine learning model can learn patterns of past users, and may output a prediction of when a current user consuming a media asset, and having certain interests and a certain viewing history, is more likely to consume or interact with supplemental content. In some embodiments, training image data may be preprocessed and represented as feature vectors.

In some embodiments, determining whether to present supplemental content may take into account a varying popularity of a particular character over the course of an episodic series (e.g., the actor may be more popular earlier in a season of episodes but become less relevant as the series progresses). In some embodiments, determining whether to present supplemental content may take into account whether a user is likely to stop watching media asset 102 at a current time. For example, the media application may communicate with a calendar application to determine that a user has a scheduled appointment, or user viewing history may be analyzed to determine that a user typically changes a channel at a particular time of day, and the supplemental content may be presented prior to the identified time of the appointment or likely channel change (e.g., even if during the particular scene of interest, such as, for example, the climax).

Figure 2:
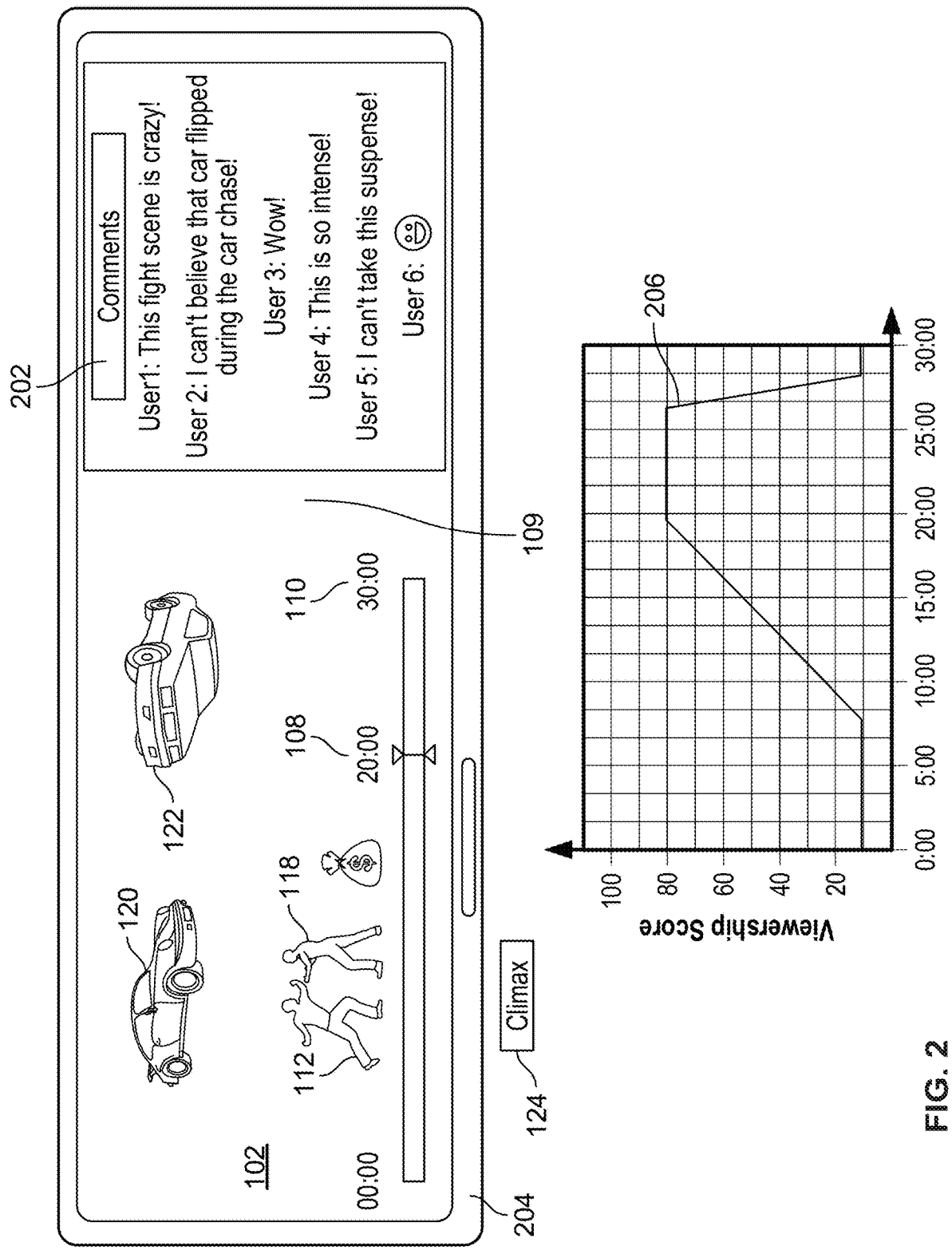
FIG. 2 shows an illustrative technique for generating a viewership score, in accordance with some embodiments of this disclosure.

FIG. 2 shows an illustrative technique for generating a viewership score, in accordance with some embodiments of this disclosure. FIG. 2 shows a device 204 of a user at which the media application is providing a stream or broadcast of media asset 102. In some embodiments, the media application may be providing a website or application (e.g., a live streaming platform) providing users with the ability to collectively view a synchronized presentation of a media asset and interact with one another. For example, the media application may receive comments 202 from users during presentation of media asset 102 and generate for display the comments in the any suitable form (e.g., text, voice, images, emojis, etc.). The media application may correlate each comment with a particular timestamp within duration 110 of media asset 102. For example, the comments shown at 202 may be associated with current play position time 108 (and/or the entire particular scene (e.g., climax 124) time period). The media application may analyze the number of user interactions at comment section 202 and/or the content of the interactions occurring during presentation of media asset 102 at particular scenes of media asset 102. For example, natural language processing circuitry or other linguistic analysis circuitry may apply linguistic, sentiment, and grammar rules to tokenize words from a text string of a comment; identify part-of-speech (i.e., noun, verb, pronoun, preposition, adverb, conjunction, participle, article); perform named entity recognition; and identify phrases, sentences, proper nouns, or other linguistic features of the text string. In some embodiments, statistical natural language processing techniques may be employed. Extracted keywords may be compared to keywords stored in a database to perform semantic and/or sentiment analysis in order to determine whether a particular comment or image is indicative of user interest in a particular scene of media asset 102. Based on this analysis, the media application may generate viewership curve 206 indicative of user interaction and/or user interest in particular portions during duration 110 of media asset 102. Various metrics may be considered in generating viewership curve 206, e.g., whether users skipped over certain portions of media asset 102 when consuming media asset 102 across various platforms, and/or social media activity across various platforms indicative of interest in a portion of media asset 102. In some embodiments, viewership curve 206 may be analyzed to determine the occurrence of a particular scene of interest (e.g., climax 124), determine the insertion point and type of supplemental content during the presentation of media asset 102, and/or may be used to inform computation of the scores associated with category 130 of data structure 150.

Figure 3:
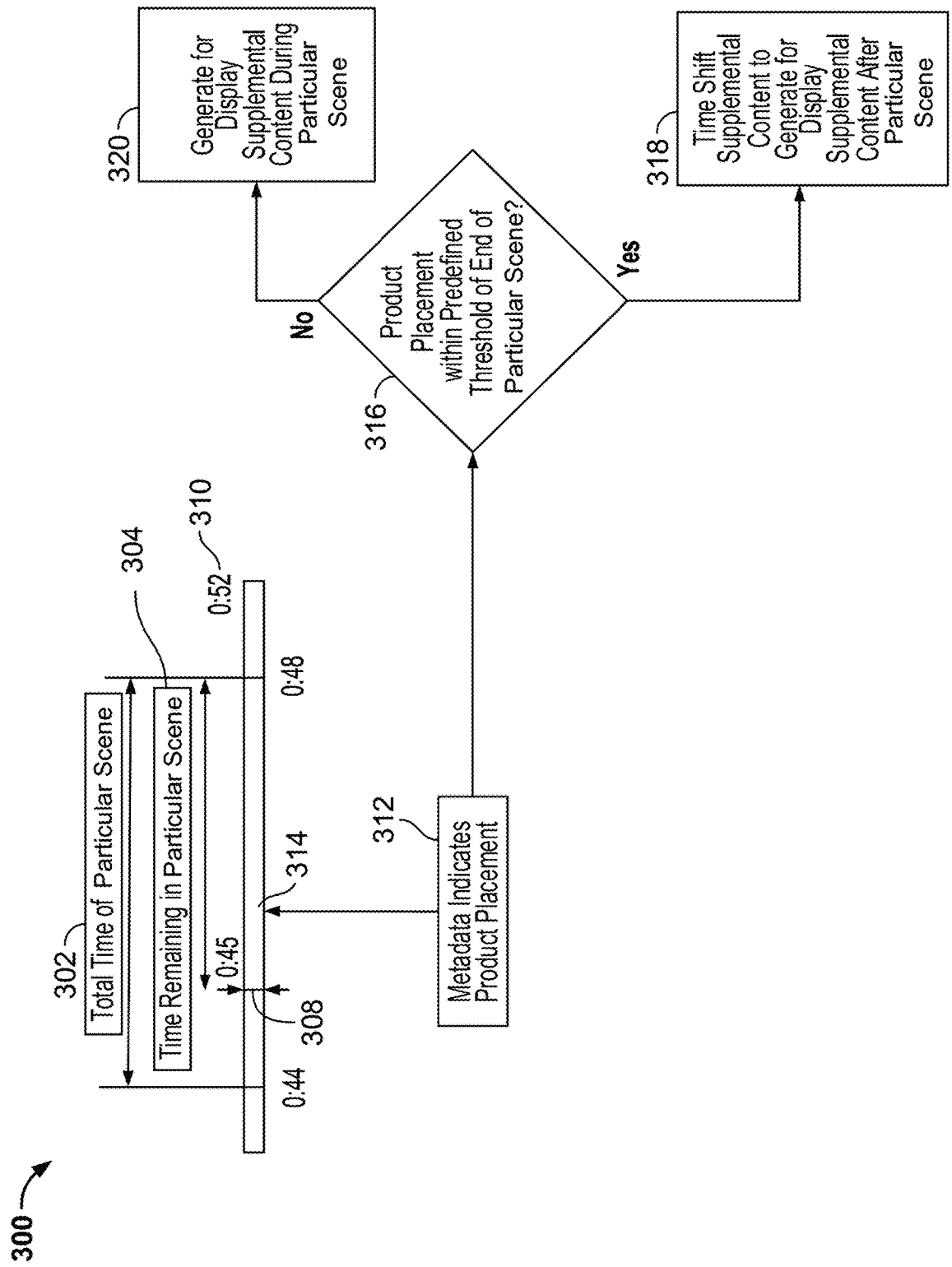
FIG. 3 shows an illustrative block diagram 300 of a system for determining when to provide supplemental content during presentation of a media asset, in accordance with some embodiments of this disclosure.

FIG. 3 shows an illustrative block diagram 300 of a system for determining when to provide supplemental content during presentation of a media asset, in accordance with some embodiments of this disclosure. The media asset may be associated with an end time 310 (e.g., 0:52 minutes) and a current play position 308 (e.g., 0:45 minutes). The media application may determine (e.g., based on metadata received from media content source 602, and/or any other suitable technique) a total time 302 of a particular scene of interest (e.g., a climax, which may be determined to be 4 minutes in duration, from 0:44-0:48 minutes) and a remaining time 304 (e.g., three minutes) of the particular scene of interest (e.g., the climax). The media application may determine that metadata of the media asset (e.g., specified in data structure 150 of FIG. 1B) indicates an upcoming product placement (e.g., car 120 of FIG. 1A) at the play time indicated at 314 (e.g., 0:46 minutes).

At 316, the media application may determine whether the upcoming product placement determined at 312 is scheduled to occur within a predefined threshold time of an end time (e.g., 0:48 minutes) of the time of a particular scene (e.g., a climax) of the media asset. For example, if the threshold period of time is three minutes, and the media application determines based on the product placement time 314 of 0:46 minutes that the product placement is schedule to occur within two minutes of the end time (e.g., 0:48 minutes) of the particular scene, the media application may determine (at 318) that the presentation of supplemental content related to the product placement should be time-shifted to occur after the time of the particular scene concludes (e.g., at an appropriate time after the 00:48 minute mark). In this way, intrusion into the user's consumption of the media asset during a particular scene (e.g., a pivotal climax or other scene of interest of the media asset) may be avoided, while at the same time supplemental content likely to be of interest to the user may still be provided during a less critical portion of the media asset.

On the other hand, if the product placement is scheduled to occur at a time that exceeds a threshold period of time (e.g., if the threshold is 1 minutes), such as at position 314 of FIG. 3 which is two minutes of the conclusion of the time of the particular scene, processing may proceed to 320, where the supplemental content may be presented at the scheduled time in connection with the product placement indicated in the metadata. This may be desirable because in some circumstances performing time-shifting of the supplemental content when a time gap between the product placement and supplemental content is considered to be too long may risk the user forgetting, or otherwise losing interest in, the supplemental content. In some embodiments, processing at 320 may still involve a time shift of the supplemental content, e.g., to a less interesting portion of the particular scene (e.g., climax). In some embodiments, the supplemental content may be provided to a second screen device (e.g., a mobile device of the user) simultaneously with the presentation on the first device of the product placement associated with the supplemental content, which may allow the user to view his or her mobile device at his or her own leisure, such as after the conclusion of the particular scene. Alternatively, the supplemental content may be provided to the second screen device at the conclusion of the particular scene, to avoid interrupting the viewing session by prompting the user to check his or her mobile device. In some embodiments, content may be provided to the second screen upon detecting a user has started using a second screen, the supplemental content is deemed to be too large or distracting to be shown at a device providing the media asset, and/or the supplemental content is the same or similar color to a background portion of the scene and thus may not be sufficiently noticeable to the user. In some embodiments, the threshold may be adjusted over time based on monitoring viewing habits and interaction with supplemental content for a specific user. In some embodiments, the threshold may vary based on a length of time of a media asset (e.g., the threshold may be less for a 30-minute program than for a 2-hour program).

Figure 4:
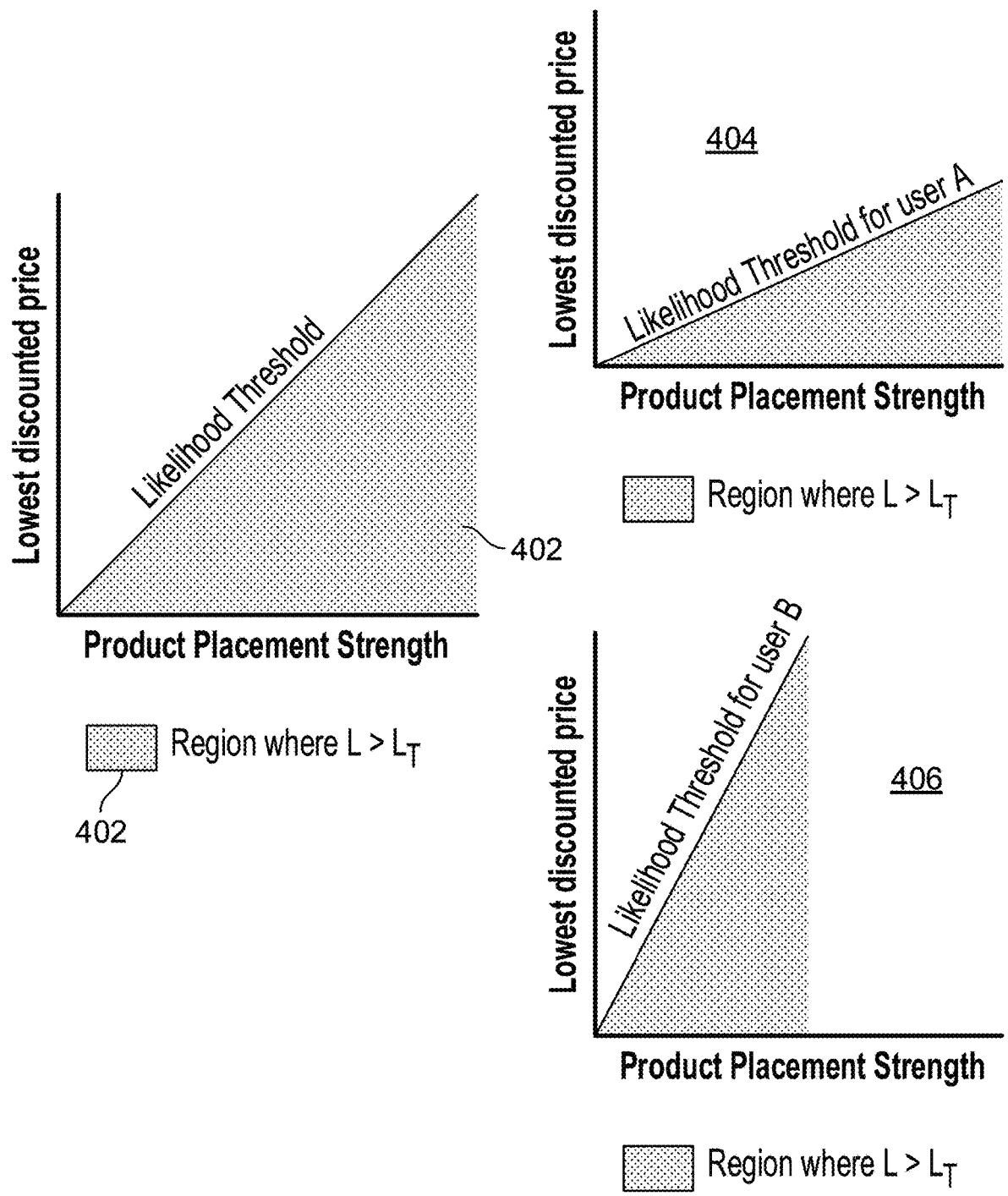
FIG. 4 is an illustrative technique for determining a likelihood of user interaction with supplemental content based on a product placement strength score and a product sale price score, in accordance with some embodiments of this disclosure.

FIG. 4 is an illustrative technique for determining a likelihood of user interaction with supplemental content based on a product placement strength score and a product sale price score, in accordance with some embodiments of this disclosure. In some embodiments, the below formula (1) may be employed to determine a likelihood of user interaction (e.g., a product purchase or other interaction) with supplemental content:

$$L = \frac{S}{O} \quad (1)$$

where L may correspond to a threshold value of a likelihood of user interaction, S may correspond to product placement strength score, and O may correspond to a discount (e.g., a percent discount) of an identified offer over a sticker price. In some embodiments, if the value of L surpasses a certain threshold $L_T$ (e.g., represented by area 402), the media application may determine that the likelihood of the viewer purchasing a product is higher than the threshold, and thus may proceed to cause the generation for display of a notification or alert to the viewer, which may be selectable to cause the user device (e.g., a browser of the user device) to be re-directed to a product purchase landing resource (e.g., a URL or application associated with the product). In some embodiments, $L_T$ may typically be a relatively high value for a specific viewer to avoid excessively disturbing the user viewing session. The media application may monitor, e.g., viewing and purchasing habits of the use, and may adjust the likelihood threshold for each user based on the monitored user characteristics. For example, as shown at 404, the threshold may be reduced for user A over time, and as shown at 406, the threshold may be increased for user B over time. In some embodiments, the techniques of FIG. 4 may be utilized in determining whether a scene corresponds to a particular scene of interest (e.g., the climax of a media asset) and thus whether supplemental content related to the scene should be presented at all, alternatively or in addition to selecting the supplemental content to be generated for display.

In adjusting the thresholds for user A, the media application may determine that user A frequently interacts with (and/or purchases products or services based on) the supplemental content, even where user preferences inferred based on a user profile or viewing history of user A are tangentially related to features of a product placed in a media asset and associated with the supplemental content, and even where a particular product price is not a particularly significant discount. On the other hand, the media application may determine that user B rarely interacts (or purchases products based on) the supplemental content, unless user preferences of user B directly align with features of the product associated with the supplemental content, and/or a particular product price is a particularly significant discount. The media application may determine that presentation of supplemental content during presentation of the media asset causes the user to skip to another portion of the media asset or cease access of the media asset. The media application may log each of these occurrences in the user profile of the user, and may adjust the threshold for user A or user B to reduce and increase the likelihood threshold, respectively, for each logged occurrence.

Figure 5:
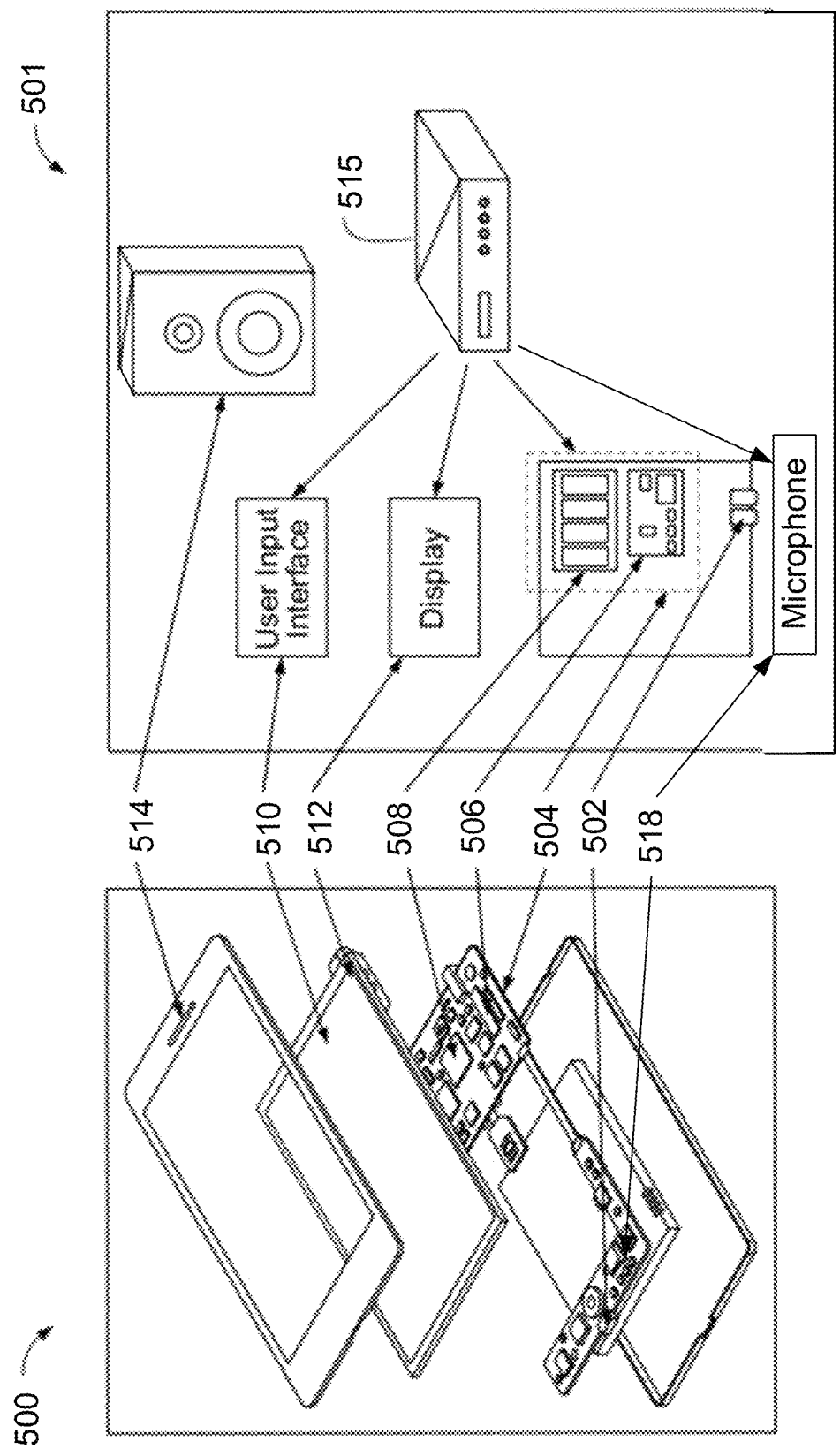
FIG. 5 shows a block diagram of an illustrative media device used in providing supplemental content relevant to metadata of a particular scene of a media asset, in accordance with some embodiments of this disclosure.
Figure 6:
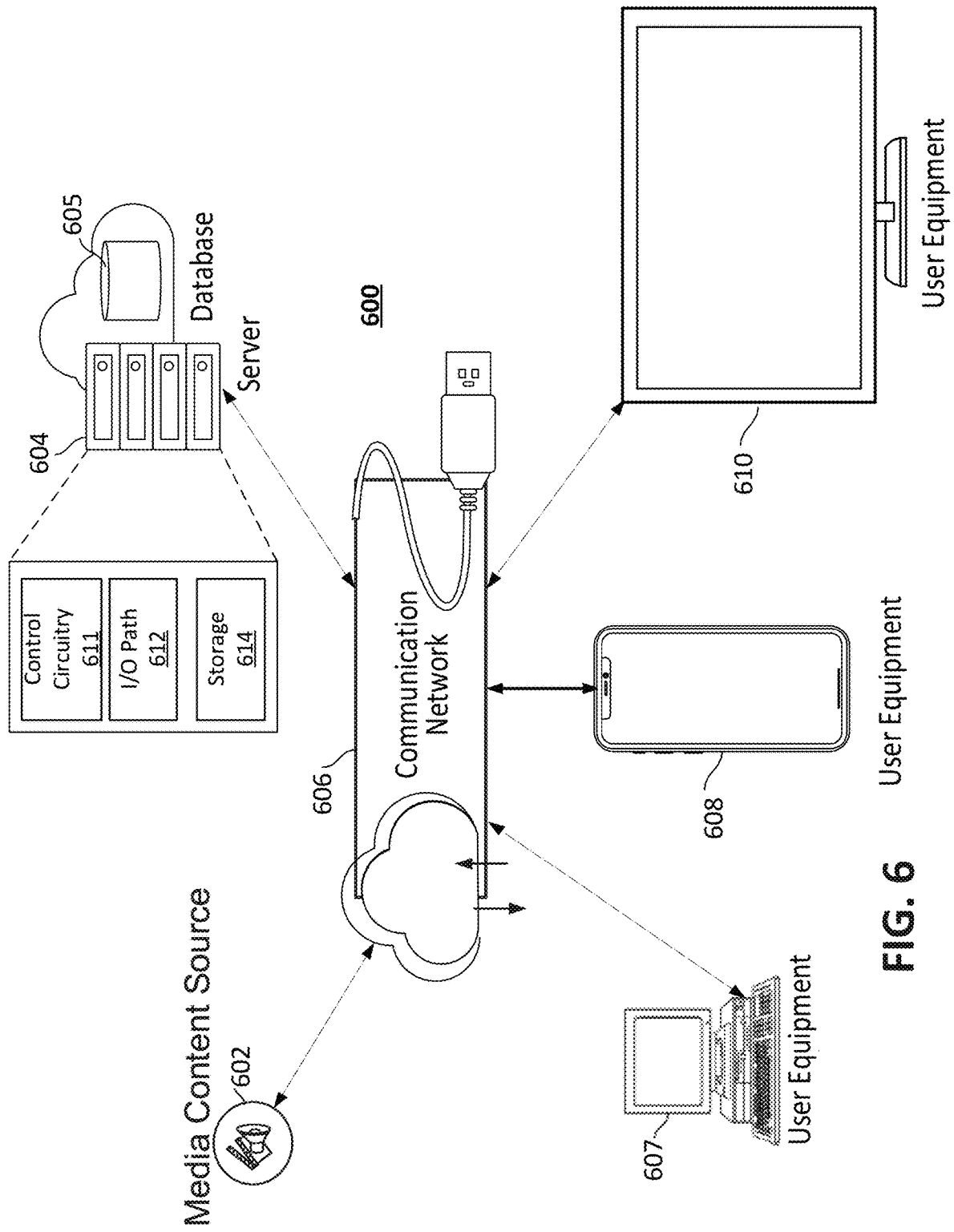
FIG. 6 shows a block diagram of an illustrative media system for providing supplemental content relevant to metadata of a particular scene of a media asset, in accordance with some embodiments of this disclosure.

FIGS. 5-6 describe illustrative devices, systems, servers, and related hardware for providing supplemental content relevant to the metadata of a particular scene of a media asset, in accordance with some embodiments of the present disclosure. FIG. 5 shows generalized embodiments of illustrative user equipment devices 500 and 501, which may correspond to user equipment device 104, 204 of FIGS. 1 and 3, respectively, and/or a second screen device. For example, user equipment device 500 may be a smartphone device. In another example, user equipment device 501 may be a user television equipment system. User television equipment device 501 may include set-top box 516. Set-top box 516 may be communicatively connected to microphone 518, speaker 514, and display 512. In some embodiments, microphone 518 may receive voice commands for the media application. In some embodiments, display 512 may be a television display or a computer display. In some embodiments, set-top box 516 may be communicatively connected to user input interface 510. In some embodiments, user input interface 510 may be a remote control device. Set-top box 516 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 5. Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the media application stored in memory (e.g., storage 508). Specifically, control circuitry 504 may be instructed by the media application to perform the functions discussed above and below. In some implementations, any action performed by control circuitry 504 may be based on instructions received from the media application.

In client/server-based embodiments, control circuitry 504 may include communications circuitry suitable for communicating with a media application server or other networks or servers. The instructions for carrying out the above mentioned functionality may be stored on a server (which is described in more detail in connection with FIG. 5. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. Display 512 may be one or more of a monitor, a television, a display for a mobile device, or any other type of display. A video card or graphics card may generate the output to display 512. The video card may be any processing circuitry described above in relation to control circuitry 504. The video card may be integrated with the control circuitry 504. Speakers 514 may be provided as integrated with other elements of each one of user equipment device 500 and user equipment system 501 or may be stand-alone units. The audio component of videos and other content displayed on display 512 may be played through the speakers 514. In some embodiments, the audio may be distributed to a receiver (not shown), which processes and outputs the audio via speakers 514.

The media application may be implemented using any suitable architecture. For example, it may be a stand-alone application wholly-implemented on each one of user equipment device 500 and user equipment device 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide supplemental content as discussed. Based on the processed instructions, control circuitry 504 may determine what action to perform when input is received from user input interface 510. For example, movement of a cursor on a display up/down may be indicated by the processed instructions when user input interface 510 indicates that an up/down button was selected.

In some embodiments, the media application is a client/server-based application. Data for use by a thick or thin client implemented on each one of user equipment device 500 and user equipment device 501 is retrieved on-demand by issuing requests to a server remote to each one of user equipment device 500 and user equipment device 501. In one example of a client/server-based guidance application, control circuitry 504 runs a web browser that interprets web pages provided by a remote server. For example, the remote server may store the instructions for the application in a storage device. The remote server may process the stored instructions using circuitry (e.g., control circuitry 504) to perform the operations discussed in connection with FIGS. 1-3.

In some embodiments, the media application may be downloaded and interpreted or otherwise run by an interpreter or virtual machine (run by control circuitry 504). In some embodiments, the media application may be encoded in the ETV Binary Interchange Format (EBIF), received by the control circuitry 504 as part of a suitable feed, and interpreted by a user agent running on control circuitry 504. For example, the media application may be an EBIF application. In some embodiments, the media application may be defined by a series of JAVA-based files that are received and run by a local virtual machine or other suitable middleware executed by control circuitry 504. In some of such embodiments (e.g., those employing MPEG-2 or other digital media encoding schemes), the media application may be, for example, encoded and transmitted in an MPEG-2 object carousel with the MPEG audio and video packets of a program.

FIG. 6 is a diagram of an illustrative streaming system, in accordance with some embodiments of this disclosure. User equipment devices 608, 609, 610 (e.g., user equipment device 104 of FIG. 1, user equipment device 104 of FIG. 2) may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 includes a media content source 602 and a server 604, which may comprise or be associated with database 605. Communications with media content source 602 and server 604 may be exchanged over one or more communications paths but are shown as a single path in FIG. 6 to avoid overcomplicating the drawing. In addition, there may be more than one of each of media content source 602 and server 604, but only one of each is shown in FIG. 6 to avoid overcomplicating the drawing. If desired, media content source 602 and server 604 may be integrated as one source device.

In some embodiments, server 604 may include control circuitry 611 and a storage 614 (e.g., RAM, ROM, Hard Disk, Removable Disk, etc.). Storage 614 may store a one or more databases. Server 604 may also include an input/output path 612. I/O path 612 may provide device information, or other data, over a local area network (LAN) or wide area network (WAN), and/or other content and data to the control circuitry 611, which includes processing circuitry, and storage 614. Control circuitry 611 may be used to send and receive commands, requests, and other suitable data using I/O path 612, which may comprise I/O circuitry. I/O path 612 may connect control circuitry 604 (and specifically processing circuitry) to one or more communications paths.

Control circuitry 611 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 611 executes instructions for an emulation system application stored in memory (e.g., the storage 614). Memory may be an electronic storage device provided as storage 614 that is part of control circuitry 611.

Server 604 may retrieve guidance data from media content source 602, process the data as will be described in detail below, and forward the data to user equipment devices 608, 609, 610. Media content source 602 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 602 may be the originator of content (e.g., a television broadcaster, a Webcast provider, etc.) or may not be the originator of content (e.g., an on-demand content provider, an Internet provider of content of broadcast programs for downloading, etc.). Media content source 602 may include cable sources, satellite providers, on-demand providers, Internet providers, over-the-top content providers, or other providers of content. Media content source 602 may also include a remote media server used to store different types of content (including video content selected by a user), in a location remote from any of the client devices. Media content source 602 may also provide supplemental content relevant to the metadata of a particular scene of a media asset as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 604), which may be located centrally or at distributed locations, that provide cloud-based services to various types of users and devices connected via a network such as the Internet via communication network 606. In such embodiments, user equipment devices may operate in a peer-to-peer manner without communicating with a central server.

Figure 7:
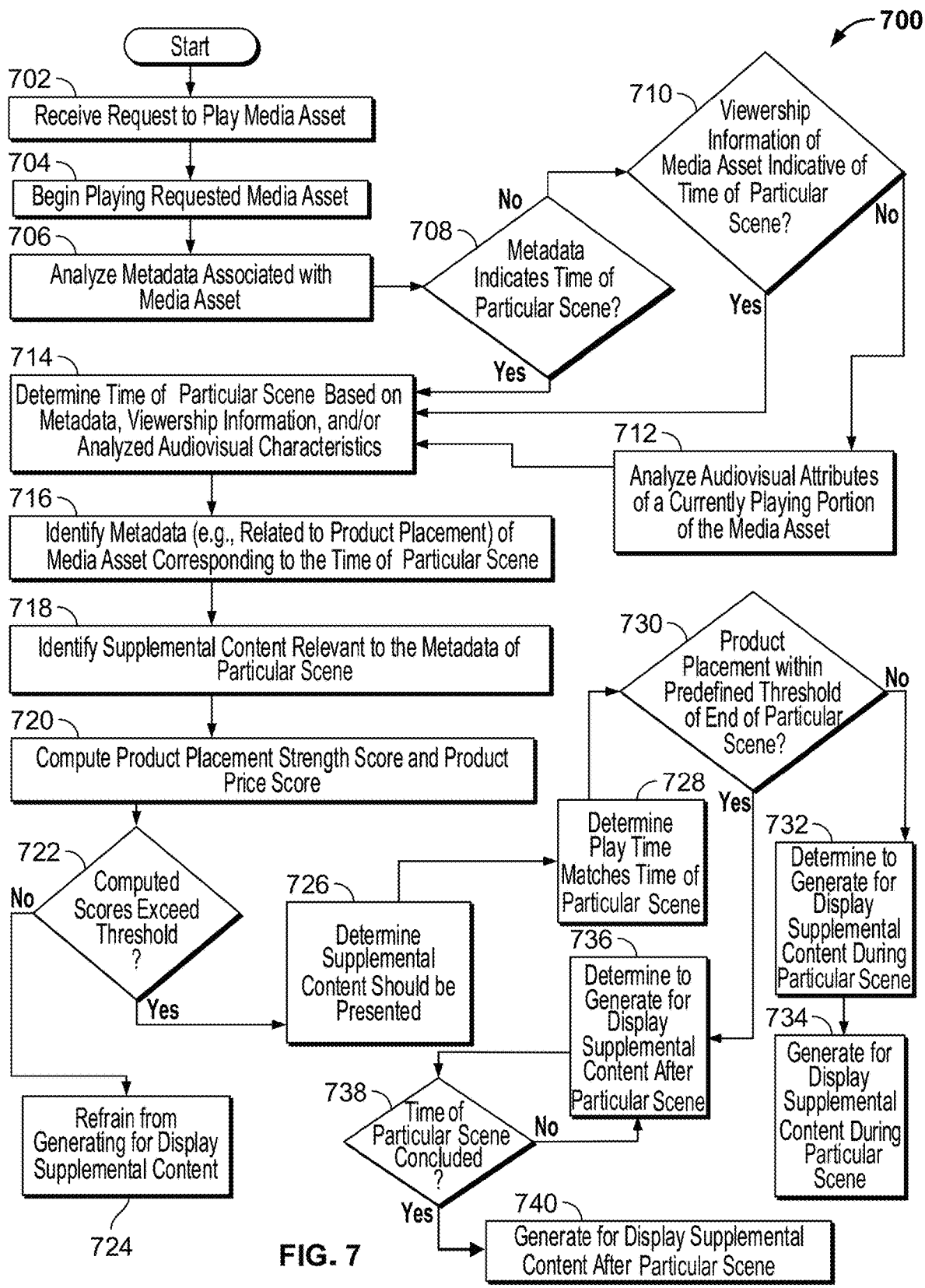
FIG. 7 is a flowchart of a detailed illustrative process for providing supplemental content relevant to the metadata of a particular scene of a media asset, in accordance with some embodiments of this disclosure.

FIG. 7 is a flowchart of a detailed illustrative process for providing supplemental content relevant to the metadata of a particular scene (e.g., the climax) of a media asset, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead. For example, the steps of process 700 may be executed at device 610 and/or server 604 of FIG. 6 to perform the steps of process 700.

At 702, control circuitry (e.g., control circuitry 504 of FIG. 5 and/or control circuitry 611 of FIG. 6) may receive a request to play a media asset (e.g., media asset 102 of FIG. 1A). The media asset may be a live broadcast, a recorded program, streaming content, etc. The media asset may be requested from media content source 602.

At 704, control circuitry (e.g., control circuitry 504 of FIG. 5 and/or control circuitry 611 of FIG. 6) may begin playing the requested media asset. For example, a remote server (e.g., control circuitry 611 of server 604 and/or media content source 602 of FIG. 6) may be configured to provide segments of a media asset to user equipment (e.g., user equipment 607, 608, 610) over a network (e.g., communication network 606).

At 706, control circuitry (e.g., control circuitry 504 of FIG. 5 and/or control circuitry 611 of FIG. 6) may analyze metadata (e.g., metadata specified in category 128 of data structure 150 of FIG. 1B) associated with media asset 102. Such metadata may be received from a remote server (e.g., control circuitry 611 of server 604 and/or media content source 602 of FIG. 6).

At 708, control circuitry (e.g., control circuitry 504 of FIG. 5 and/or control circuitry 611 Of FIG. 6) may determine whether the metadata indicates a time of a particular scene of interest (e.g., a climax). For example, the control circuitry may determine that metadata associated with a particular timestamp of the media asset (e.g., timestamp 138 specified in data structure 150 of FIG. 1B) indicates that the particular scene of the media asset occurs during that time period. If such metadata is present, processing may proceed to 714. Otherwise, processing may proceed to 710.

At 710, control circuitry (e.g., control circuitry 504 of FIG. 5 and/or control circuitry 611 Of FIG. 6) may identify viewership information related to consumption of the media asset (e.g., media asset 102 of FIG. 1A). For example, the control circuitry may be configured to generate or retrieve a viewership curve (e.g., viewership curve 206) on the basis of mining one or more sources of information, e.g., social media activity across any relevant platform such as, for example, comments 202 on a stream of media asset 204, online plot reviews, consumption information indicating a number of viewers of a particular scene and/or whether particular scenes were skipped, etc. Based on the viewership score, the control circuitry may determine that a particular scene or scenes of the media asset corresponds to a particular scene of interest (e.g., a climax). Otherwise, processing may proceed to 712.

At 710, control circuitry (e.g., control circuitry 504 of FIG. 5 and/or control circuitry 611 Of FIG. 6) may analyze audiovisual attributes of a currently playing portion of the media asset (e.g., scene 109 of media asset 102 of FIG. 1A). The control circuitry may use any suitable image recognition technique to analyze frames of the media asset and may use any suitable audio analysis technique (e.g., speech-to-text transcription and natural language analysis of dialogue of a scene to discern semantics and sentiments of the scene) to identify audiovisual attributes. In some embodiments, the audiovisual attributes may be indicative of a time of the particular scene (e.g., a climax or other portion of the media asset likely to capture the attention of the user consuming the media asset and/or featuring a product the user consuming the media asset is likely to be interested in) based on a genre of the media asset. For example, if the control circuitry determines that a particular scene has a lot of action and violence and features the main actor in a media asset having a genre of "Action" (and is occurring towards an end of the media asset) such determinations may weigh in favor of a finding that the particular scene is a time of the particular scene of interest.

At 714, control circuitry (e.g., control circuitry 504 of FIG. 5 and/or control circuitry 611 Of FIG. 6) may determine the time of the particular scene based on one or more of the metadata, viewership information, and analyzed audiovisual characteristics. For example, the control circuitry may determine that scene 109 of FIG. 1A corresponds to the time of the particular scene (e.g., climax 124).

At 716, control circuitry (e.g., control circuitry 504 of FIG. 5 and/or control circuitry 611 Of FIG. 6) may identify metadata (e.g., related to product placement) of the media asset corresponding to the time of the particular scene (e.g., climax). For example, metadata of category 128 of data structure 150 may be used by the control circuitry to identify different objects (e.g., products such as car 120 of FIG. 1A) in particular scenes. Additionally or alternatively, the control circuitry may utilize object detection techniques to identify objects in a currently playing scene (e.g., by utilizing machine learning techniques and/or comparing extracted features of an object in a current scene to features of objects in a database, such as database 605 of FIG. 6).

At 718, control circuitry (e.g., control circuitry 504 of FIG. 5 and/or control circuitry 611 Of FIG. 6) may identify supplemental content relevant to the metadata of the particular scene of interest. For example, the control circuitry may reference a database (e.g., database 605 of FIG. 6) storing associations between certain products and network locations of supplemental content, and/or may crawl the web to identify suitable supplemental content related to metadata (e.g., car 120 of FIG. 1A) of the time of the particular scene of interest (e.g., time period 138 of FIG. 1B).

At 720, control circuitry (e.g., control circuitry 504 of FIG. 5 and/or control circuitry 611 Of FIG. 6) may compute a product placement strength score and a product price score for one or more objects of a particular scene (e.g., as shown at category 130 of data structure 150 of FIG. 1A). Such aspects are discussed in more detail in connection with FIG. 8.

At 722, the control circuitry may determine whether the computed scores (e.g., a ratio of the computed scores) exceeds a predefined threshold. For example, a likelihood threshold may be determined based on the technique discussed in connection with FIG. 4. In some embodiments, the predefined threshold may be adjustable over time based on monitoring user interactions and viewing patterns.

At 724, if the control circuitry (e.g., control circuitry 504 of FIG. 5 and/or control circuitry 611 Of FIG. 6) determines the computed scores do not exceed the threshold, the control circuitry may refrain from generating for display supplemental content. This may avoid providing supplemental content to a user when he or she is determined as unlikely to be sufficiently interested in the supplemental content and/or where the price of a product associated with the supplemental content is not optimal, thereby reducing the likelihood of user interaction with the supplemental content.

At 726, if the control circuitry (e.g., control circuitry 504 of FIG. 5 and/or control circuitry 611 Of FIG. 6) determines the computed scores do exceed the threshold, the control circuitry may determine that the supplemental content (e.g., alert 122 associated with a video accessible by way of a URL related to car 120) should be presented.

At 728, the control circuitry (e.g., control circuitry 504 of FIG. 5 and/or control circuitry 611 Of FIG. 6) may determine whether a current play time (e.g., play time 108) of the media asset (e.g., media asset 102 of FIG. 1A) matches the determined time of the particular scene of interest (e.g., climax 124 of FIG. 1A). The control circuitry may perform this step by comparing the current time to the determined time of the particular scene.

At 730, the control circuitry (e.g., control circuitry 504 of FIG. 5 and/or control circuitry 611 Of FIG. 6) may determine whether the product placement associated with the supplemental content is to occur or is occurring within a predefined threshold of the end of the particular scene (e.g., climax 124 of FIG. 1A). For example, the control circuitry may determine that the time of a product placement in the particular scene (e.g., car 120 is depicted at the time point of 20:00 at current play position 108 of scene 109 corresponding to climax 124 of media asset 102) is occurring a certain period of time (e.g., about 7 minutes) from the end of the particular scene (e.g., climax 124). If the threshold time is, e.g., 5 minutes, processing may proceed to 732 based on determining the product placement is not within a predefined end of the particular scene. On the other hand, if the control circuitry determines that the product will continue to be displayed during the particular scene (e.g., to at least a time of the particular scene that matches or exceeds the threshold time) processing may proceed to 736. As another example, if the control circuitry determines that the product placement in the particular scene is scheduled to first occur at a time in the particular scene at which the remaining time in the particular scene is less than the predefined threshold, processing may proceed to 736.

At 732, the control circuitry (e.g., control circuitry 504 of FIG. 5 and/or control circuitry 611 Of FIG. 6) may determine to generate for display the supplemental content during the time of the particular scene, e.g., to avoid the possibility that the user may forget about or lose interest in the product related to the supplemental content by the time the particular scene concludes. At 734, the control circuitry may generate for display the supplemental content (e.g., user equipment 104 and/or a second screen device of the user in a vicinity of user equipment 104 of FIG. 1A).

At 736, the control circuitry (e.g., control circuitry 504 of FIG. 5 and/or control circuitry 611 of FIG. 6) may determine that the supplemental content should be presented after the particular scene. For example, the control circuitry may determine that the product placement is sufficiently close to the end of the time of the particular scene (e.g., time of climax 124 of FIG. 1B) that the user is likely to be engaged with the supplemental content even if presentation of the supplemental content is time-shifted to, e.g., immediately after the conclusion of the particular scene, and thus distraction of the user during the particular scene (e.g., a pivotal climax portion) of the media asset (e.g., media asset 102 of FIG. 1A) may be avoided. In some embodiments, the control circuitry may determine to present the supplemental content prior to the beginning of the climax, or after conclusion of the media asset (e.g., at the credits).

At 738, in response to determining that the time of the particular scene (e.g., at the 27:00 minute mark of climax 124 media asset 102 of FIGS. 1A-1B) has concluded, processing may proceed to 740. Otherwise, the control circuitry may wait for the end of the particular scene. Any suitable technique may be utilized to determine the end of the particular scene. As an example, metadata (e.g., specified in data structure 150 of FIG. 1A) may indicate a timestamp associated with the conclusion of the particular scene. Additionally or alternatively, viewership information may be referenced in a similar manner as discussed in connection with 710, e.g., a time period in which social activity decreases or viewership decrease may be correlated to an end of the particular scene. As another example, audiovisual attributes of the media asset may be analyzed by, e.g., a heuristic-based technique and/or machine learning techniques. For example, in a media asset of the genre "Action," the control circuitry may determine that violence and/or fast movements have concluded, and/or a main character has exited the scene, which may suggest an ending of the particular scene. In some embodiments, during a live event (e.g., a sports game), the control circuitry may determine to present the supplemental content after the conclusion of the game (e.g., during a trophy presentation, to avoid interrupting the final moments of a close game). For example, the control circuitry may determine whether a score of the game is within a threshold amount (e.g., varying depending on the sport, such as, for example, 14 points in football, or 10 points in basketball, which may be stored in a database and/or dynamically determined based on analysis of sporting event data), and if so, time-shift presentation of supplemental content until the conclusion of the sporting event.

At 740, control circuitry (e.g., control circuitry 504 of FIG. 5 and/or control circuitry 611 of FIG. 6) may generate for display the supplemental content after the identified end of the particular scene (e.g., climax 124 of FIG. 1). In some embodiments, the control circuitry may generate for display an alert (e.g., message 122 selectable to display auxiliary content associated with car 120 on the current screen or re-direct the user device to a URL associated with the video) or may present content automatically on the current screen (e.g., an auxiliary video related to car 120 within scene 111)

Figure 8:
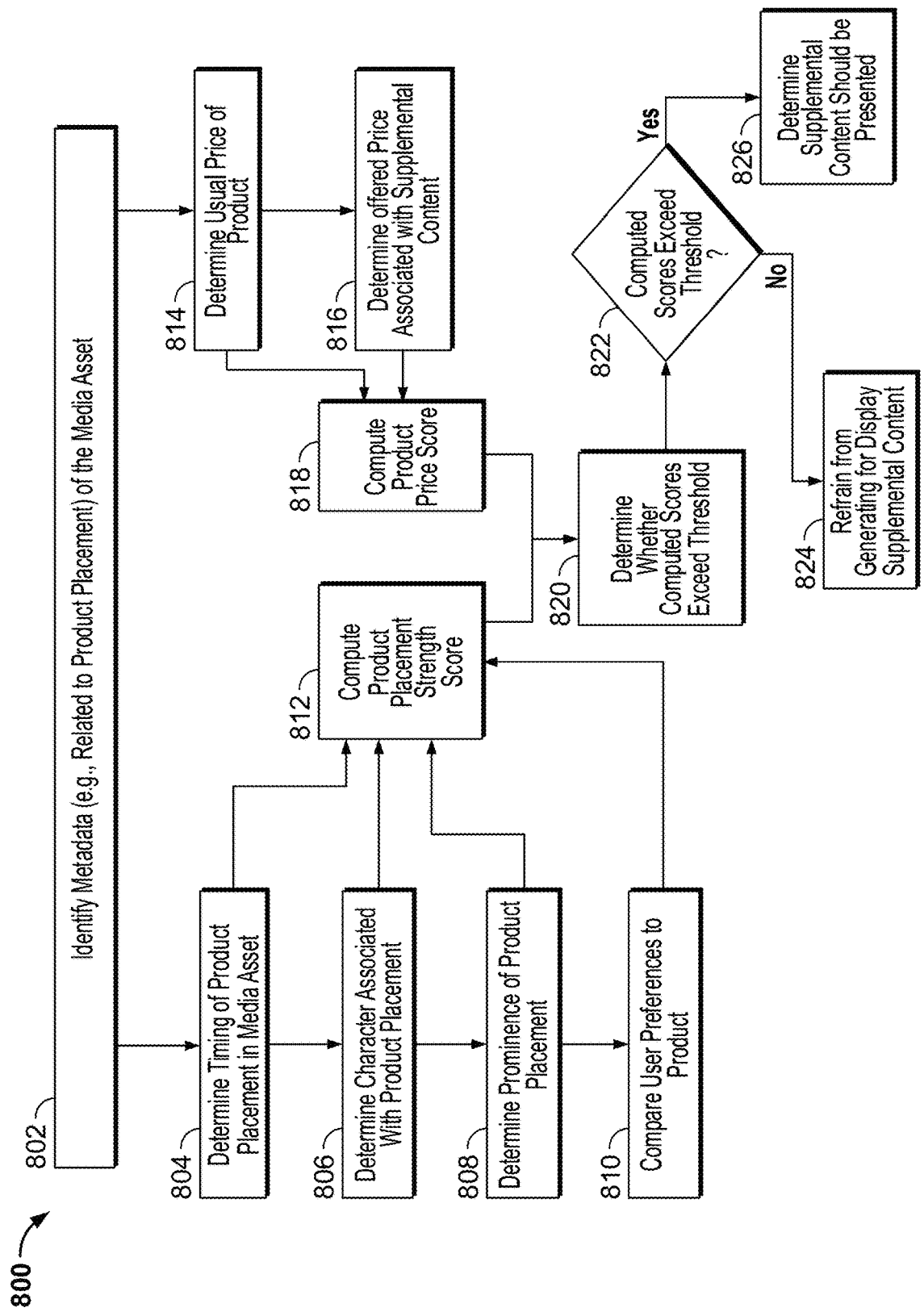
FIG. 8 is a flowchart of a detailed illustrative process for determining whether to provide supplemental content relevant to metadata of a particular scene of a media asset, in accordance with some embodiments of this disclosure.

FIG. 8 is a flowchart of a detailed illustrative process for determining whether to provide supplemental content relevant to the metadata of a particular scene (e.g., a climax) of a media asset, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead. For example, the steps of process 800 may be executed at device 610 and/or server 604 of FIG. 6 to perform the steps of process 800.

At 802, control circuitry (e.g., control circuitry 504 of FIG. 5 and/or control circuitry 611 of FIG. 6) may identify metadata (e.g., related to product placement) of the media asset. 802 may be performed in a similar manner as discussed in connection with 716 of FIG. 7. For example, the control circuitry may identify car 120 of FIG. 1A on the basis of the identified metadata of media asset 102.

At 804, the control circuitry may determine a timing of product placement in media asset. For example, using the techniques discussed in connection with 708, 710, 712, 714 of FIG. 7, the control circuitry may identify a plot structure category for each portion of the media asset (e.g., media asset 102 of FIG. 1A), e.g., "exposition," "fight," "plot twist," "inciting incident," "climax," "resolution," "denouement," etc. The media application may identify a timestamp within media asset 102 of a particular scene, such as, for example, a significant occurrence in media asset 102, e.g., the climax or a fight. For example, a product placement associated with a the particular scene (e.g., the climax or portion of the media asset likely to be more interesting to a user) may be assigned a higher weight than a product placement at a more obscure point of the media asset.

At 806, the control circuitry may determine a character associated with the product placement, e.g., based on one or more of metadata associated with a media asset (e.g., media asset 102 of FIG. 1A), object recognition techniques to identify certain actors (e.g., by extracting features of an on-screen actor and comparing the features to those stored in a database or images of popular actors accessible via a search engine), and/or viewership information (e.g., online comments regarding the performance of a particular actor in the media asset). For example, detected object features thereof may be compared (e.g., pixel by pixel) to objects and associated features stored in a database (e.g., database 605 of FIG. 6) to determine whether the detected features match an object in the database.

In some embodiments, if the character associated with a product placement (e.g., a particular brand of beer) is associated with a particular character (e.g., James Bond is depicted drinking the particular brand of beer) and a famous actor (e.g., Daniel Craig), this factor may be assigned a higher weight than a product placement with a less well known actor playing a less significant role in the media asset. In some embodiments, the importance of an actor or character may be determined based on the total amount of time the actor has been depicted on-screen up to the current point of the media asset and/or by referencing a table indicating the most popular actors.

At 808, control circuitry (e.g., control circuitry 504 of FIG. 5 and/or control circuitry 611 of FIG. 6) may determine a prominence of a placement of the product in the media asset. For example, the control circuitry may determine a number of pixels (or percentage of a current display) associated with each of one or more products relative a total number of displayed pixels. Such determination may be based on metadata associated with the media asset (e.g., retrieving coordinates of objects in a scene), and/or based on edge detection techniques to determine boundaries (e.g., edges, shape outline, border) of objects in a scene and/or analyzing pixel values of the area surrounding objects. For example, if the media application detects that brightness of adjacent pixels abruptly changes, the media application may determine that this is indicative of an edge of an object, and may calculate the number of pixels of the object based on the determined edges being the perimeter of the object.

In some embodiments, the prominence of the product placement may be determined based at least in part on whether the product placement is in the center of the screen rather than off to a side. In some embodiments, the prominence of the product placement may be determined at least in part based on whether a main character is holding, using or otherwise interacting or discussing the product. The prominence of the product placement may depend on how central the product is to a scene, e.g., car 120 of FIG. 1A being used in a pivotal car chase of the media asset may be assigned a higher weight, whereas a car parked on the street and not playing a key role in the scene may be assigned a lower rate.

At 810, control circuitry (e.g., control circuitry 504 of FIG. 5 and/or control circuitry 611 of FIG. 6) may compare user preferences, e.g., associated with a user profile, to the product. For example, the control circuitry may access, from a profile associated with the user, user interest data, which may include the user's social media activity, online search history, online purchase history, and other personal data indicative of the user's interests. Metadata of the product may be compared to the user interest data to determine whether there is a match. For example, a product (e.g., car 120) may be assigned certain tags (e.g., sports car, Porsche), and if the user has recently been searching for sports cars of German cars, or has searched for sports cars or German cars more than a threshold number of times, the media guidance application may determine a match, and assign a higher weight to the product.

At 812, control circuitry (e.g., control circuitry 504 of FIG. 5 and/or control circuitry 611 of FIG. 6) may compute a product placement strength score based on one or more of the factors determined at 804, 806, 808, and any other suitable factors. In some embodiments, the control circuitry may combine individual scores of the timing of the product placement, the character associated with the product placement, the prominence of the product placement, and user preferences relative to the type of product, to generate the product placement strength score (e.g., on a scale of 0-100). A higher product placement strength score may indicate a higher likelihood of user interaction with supplemental content related to the product. In some embodiments, a machine learning model may be employed to take as input the individual scores or weights assigned at 804, 806, 808, 810 and output a combined score reflecting the likelihood of user interaction.

At 814, the control circuitry may determine a usual price or sticker price for the product (e.g., car 120 of FIG. 1A). To make this determination, the control circuitry may access a database or website indicating the historical or typical pricing at popular sites (e.g., the company website associated with the product, a website that aggregates prices from across the web, a most common website from which products of this type are purchased, and/or a website associated with a company within a threshold distance from the user, etc.).

At 816, the control circuitry may determine whether a price of the product associated with the supplemental content is available at a better price than the identified usual price. For example, if the product corresponds to a soda, the control circuitry may determine that while the sticker price of a bottle of Coca Cola is $1.00, currently the lowest price available is $0.65, and thus a 35% discount is available (e.g., 65% of the sticker price). In some embodiments, a lower price may be assumed to enhance the likelihood of user interaction with the supplemental content.

At 818, control circuitry (e.g., control circuitry 504 of FIG. 5 and/or control circuitry 611 of FIG. 6) may compute a product price score (e.g., from 0-100) on the basis of the comparison of 814 the sticker price to the current sale price of 816.

At 820, control circuitry (e.g., control circuitry 504 of FIG. 5 and/or control circuitry 611 of FIG. 6) may compute a combined score on the basis of the product placement strength score and the product price score, e.g., the control circuitry may determine a ratio of one of the scores to the other of the scores, multiply the scores, add the scores, use the higher of the two scores, determine if each score is above a particular threshold, etc. The control circuitry may compare the computed combined score to a threshold to determine whether supplemental content should be presented to a user during presentation of the requested media asset (e.g., media asset 102). 822, 824, and 826 of FIG. 8 may be performed in a similar manner as to 722, 724, and 726, respectively, of FIG. 7.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a time of a particular scene of a media asset currently being played, wherein the media asset comprises a plurality of scenes;
   identifying metadata of the media asset corresponding to the time of the particular scene;
   identifying supplemental content relevant to the metadata of the particular scene;
   determining whether the particular scene comprises a climax of the media asset based on the metadata of the particular scene;
   in response to determining that the particular scene is the climax of the media asset:
   (i) delaying generating for display the identified supplemental content relevant to the metadata of the particular scene while the particular scene is currently being played;
   (ii) determining that the particular scene of the plurality of scenes of the media asset has concluded; and
   (iii) in response to determining that the particular scene of the plurality of scenes of the media asset has concluded, generating for display the identified supplemental content relevant to the metadata of the particular scene.

2. The method of claim 1, further comprising:
   in response to determining that the particular scene is not the climax of the media asset, generating for display the identified supplemental content relevant to the metadata of the particular scene while the particular scene is currently being played.

3. The method of claim 1, further comprising:
   determining a duration of the particular scene;
   determining, based on the duration of the particular scene, an amount of time remaining in the particular scene;
   determining whether the amount of time remaining in the particular scene is less than a predefined threshold period of time; and
   in response to determining that the amount of time remaining in the particular scene is less than the predefined threshold period of time, performing the generating for display of the identified supplemental content relevant to the metadata of the particular scene in response to determining the particular scene of the media asset has concluded.

4. The method of claim 1, wherein:
   identifying metadata of the media asset corresponding to the time of the particular scene comprises identifying a product depicted during the time of the particular scene; and
   identifying the supplemental content relevant to the metadata of the particular scene is performed based on:
     determining a popularity of a character of the media asset featured in the time of the particular scene;
     determining a prominence of a depicted placement of the product; and
     determining the relevance of the product to a user profile associated with consumption of the media asset.

5. The method of claim 1, wherein determining the time of the particular scene of the media asset comprises:
   analyzing respective metadata items for a plurality of portions of the media asset, wherein a metadata item of the plurality of metadata items for the plurality of portions of the media asset indicates that the portion of the media asset corresponding to the metadata item is within the time of the particular scene.

6. The method of claim 1, wherein determining the time of the particular scene of the media asset comprises:
   analyzing audiovisual attributes of a currently playing portion of the media asset by processing image data and/or audio data of the currently playing portion; and
   based at least in part on the analyzing audiovisual attributes of the currently playing portion of the media asset, determining whether the currently playing portion of the media asset is within the time of the particular scene.

7. The method of claim 6, further comprising:
   identifying a genre of the media asset,
   wherein determining whether the currently playing portion of the media asset is within the time of the particular scene is based on the analyzed audiovisual attributes of the currently playing portion and the genre of the media asset.

8. The method of claim 6, further comprising:
   determining an amount of time remaining in the media asset,
   wherein determining whether the currently playing portion of the media asset is within the time of the particular scene is based on the analyzed audiovisual attributes of the currently playing portion and the amount of time remaining in the media asset.

9. The method of claim 1, wherein determining the time of the particular scene of the media asset comprises:

identifying viewership information, in a plurality of user profiles, related to consumption of the media asset, wherein determining whether the currently playing portion of the media asset is within the time of the particular scene is based on the identified viewership information.

10. The method of claim 9, wherein identifying the viewership information comprises retrieving via a network one or more of social media posts related to the media asset, reviews or summaries of the media asset, and information in the plurality of user profiles specifying skipped portions of the media asset.

11. A system comprising:
input/output (I/O) circuitry configured to:
receive a request to play a media asset; and
control circuitry configured to:
determine a time of a particular scene of the media asset currently being played, wherein the media asset comprises a plurality of scenes;
identify metadata of the media asset corresponding to the time of the particular scene;
identify supplemental content relevant to the metadata of the particular scene;
determine whether the particular scene comprises a climax of the media asset based on the metadata of the particular scene;
in response to determining that the particular scene is the climax of the media asset:
(i) delay generating for display the identified supplemental content relevant to the metadata of the particular scene while the particular scene is currently being played;
(ii) determine that the particular scene of the plurality of scenes of the media asset has concluded; and
(iii) in response to determining that the particular scene of the plurality of scenes of the media asset has concluded, generate for display the identified supplemental content relevant to the metadata of the particular scene; and
in response to determining that the particular scene is not the climax of the media asset, generate for display the identified supplemental content relevant to the metadata of the particular scene while the particular scene is currently being played.

12. The system of claim 11, wherein the control circuitry is further configured to determine whether the particular scene comprises the climax of the media asset based on determining whether an audio level of the particular scene exceeds a predefined threshold.

13. The system of claim 11, wherein the control circuitry is further configured to:
determine a duration of the particular scene;
determine, based on the duration of the particular scene, an amount of time remaining in the particular scene;
determine whether the amount of time remaining in the particular scene is less than a predefined threshold period of time; and
in response to determining that the amount of time remaining in the particular scene is less than the predefined threshold period of time, perform the generating for display of the identified supplemental content relevant to the metadata of the particular scene in response to determining the particular scene of the media asset has concluded.

14. The system of claim 11, wherein:
the control circuitry is configured to identify the metadata of the media asset corresponding to the time of the particular scene by identifying a product depicted during the time of the particular scene; and
the control circuitry is configured to identify the supplemental content relevant to the metadata of the particular scene by:
determining a popularity of a character of the media asset featured in the time of the particular scene;
determining a prominence of a depicted placement of the product; and
determining the relevance of the product to a user profile associated with consumption of the media asset.

15. The system of claim 11, wherein the control circuitry is configured to determine the time of the particular scene of the media asset by:
analyzing respective metadata items for a plurality of portions of the media asset, wherein a metadata item of the plurality of metadata items for the plurality of portions of the media asset indicates that the portion of the media asset corresponding to the metadata item is within the time of the particular scene.

16. The system of claim 11, wherein the control circuitry is configured to determine the time of the particular scene of the media asset by:
analyzing audiovisual attributes of a currently playing portion of the media asset by processing image data and/or audio data of the currently playing portion; and
based at least in part on the analyzing audiovisual attributes of the currently playing portion of the media asset, determining whether the currently playing portion of the media asset is within the time of the particular scene.

17. The system of claim 16, wherein the control circuitry is further configured to:
identify a genre of the media asset,
determine whether the currently playing portion of the media asset is within the time of the particular scene based on the analyzed audiovisual attributes of the currently playing portion and the genre of the media asset.

18. The system of claim 16, wherein the control circuitry is further configured to:
determine an amount of time remaining in the media asset,
determine whether the currently playing portion of the media asset is within the time of the particular scene based on the analyzed audiovisual attributes of the currently playing portion and the amount of time remaining in the media asset.

19. The system of claim 11, wherein the control circuitry is configured to determine the time of the particular scene of the media asset by:
identifying viewership information, in a plurality of user profiles, related to consumption of the media asset, and
determining whether the currently playing portion of the media asset is within the time of the particular scene based on the identified viewership information.

20. The system of claim 19, wherein the control circuitry is configured to identify the viewership information by retrieving via a network one or more of social media posts related to the media asset, reviews or summaries of the media asset, and information in the plurality of user profiles specifying skipped portions of the media asset.

* * * * *